United States Patent [19]

Bordaz et al.

[11] Patent Number: 6,148,378

[45] Date of Patent: Nov. 14, 2000

[54] PROCESS FOR OPERATING A MACHINE WITH NON-UNIFORM MEMORY ACCESS AND CACHE COHERENCY AND A MACHINE FOR IMPLEMENTING THE PROCESS

[75] Inventors: Thierry Bordaz, Domène; Jean-Dominique Sorace, Lancey, both of France

[73] Assignee: Bull S.A., Louveciennes, France

[21] Appl. No.: 09/082,938

[22] Filed: May 22, 1998

[30] Foreign Application Priority Data

May 26, 1997 [FR] France .................................. 97 06388

[51] Int. Cl.$^7$ .................................................. G06F 12/00
[52] U.S. Cl. ......................... 711/147; 711/122; 711/141; 711/206; 379/101; 379/102
[58] Field of Search .......................... 365/230.06; 379/10; 709/101, 102; 711/122, 141, 206, 147

[56] References Cited

U.S. PATENT DOCUMENTS

| | | | |
|---|---|---|---|
| 4,068,304 | 1/1978 | Beausoleil et al. ...................... | 395/500 |
| 5,887,146 | 3/1999 | Baxter et al. ........................... | 710/104 |
| 6,014,690 | 1/2000 | VanDoren et al. ...................... | 709/215 |

OTHER PUBLICATIONS

Patent Abstracts of Japan vol. 014, No. 462 (P–1113), Oct. 5, 1990 & JP 02 181844 A (Matsushita Electric Ind Co. Ltd) Jul. 16, 1990—Abstract.

Lenoski D et al.: The Dash Prototype: Logic Overhead and Performance IEEE Transactions on Parallel and Distributed Systems, vol. 4, No. 1, Jan. 1, 1993 pp. 41–61, XP000381324.

Verghese B. et al.: "Operating System Support for Improving Data Locality on CC–Numa Compute Servers", ACM Sigplan Notices, vol. 31, No. 9, Sep. 1996, pp. 279–289, XP000639239.

Kumar M J et al: "Hierarchical Directory–Based Shared Memory Architecture" Computer Journal 3.1—p. 210, vol. 38, No. 3, Jan. 1, 1995, pp. 207–216, XP000558437.

*Primary Examiner*—Do Hyun Yoo
*Assistant Examiner*—Mehdi Namazi
*Attorney, Agent, or Firm*—Miles & Stockbridge P.C.; Edward J. Kondracki

[57] ABSTRACT

A machine with non-uniform memory access and cache coherency is constituted by a plurality of modules (10, 20, 40, 60), each module comprising a unit (6, 26, 46, 66), the unit (6) comprising at least a first table (8) for managing local accesses to a memory part (5') local to the module (10) and a second table (9) for managing accesses to a memory part (25', 45', 65') remote from the module (10), by means of a system bus (7). The machine comprises:

- a counter (81) of replacements in the table (8) and a counter (83) of accesses to the first table (8);
- a counter (91) of replacements in the table (9) and a counter (93) of accesses to the second table (9).

The replacement and access counters make it possible to optimize the size of the first and second tables (8) and (9), and/or the strategies for correspondence between virtual addresses and physical addresses.

6 Claims, 4 Drawing Sheets

PROCESS FOR OPERATING A MACHINE WITH NON-UNIFORM MEMORY ACCESS AND CACHE COHERENCY AND A MACHINE FOR IMPLEMENTING THE PROCESS

CROSS REFERENCE TO RELATED APPLICATION

The subject matter of this application is related to U.S. application Ser. No. 09/083,154 Docket 5887, in the names of Thierry BORDAZ and Jean-Dominique SURACE, filed concurrently herewith and assigned to the Assignee of the present invention and corresponding to French application 97 06387 filed May 26, 1997.

BACKGROUND OF THE INVENTION

1. Field of the Invention

The invention relates to a process for producing a machine with non-uniform memory access and cache coherency, and a machine adapted for implementing a process of this type, in the data processing field.

2. Description of Related Art

In the data processing field, it is possible to increase the power of a machine by increasing the number of processors of which it is composed. One type of machine known by the name symmetric multi-processor (SMP) allows various processors in the same machine to access its memory symmetrically by means of a system bus. These are machines with uniform memory access, in that the memory access time is substantially the same for all the data accessed. However, the performance curve of such machines does not increase in a linear way as a function of the number of processors. A high number of processors requires the machine to manage more problems of accessibility to its resources than it has resources available for running applications. The result of this is that the performance curve drops considerably when the number of processors exceeds an optimum value, often estimated to be on the order of four. The prior art offers various solutions to this problem.

One known solution consists of grouping a plurality of machines into clusters, in order to have them communicate with one another through a network. Each machine has an optimal number of processors, for example four, and its own operating system. It establishes a communication with another machine every time it performs an operation on data maintained by this other machine. The time required for these communications and the need to work on consistent data causes latency problems for high-volume applications such as, for example, distributed applications which require numerous communications. Latency is the duration that separates the instant at which a request for access to the memory is sent, and the instant at which a response to this request is received.

Another known solution is that of machines of the type non-uniform memory access (NUMA). These are machines with non-uniform memory access, in that the memory access time varies according to the location of the data accessed. A NUMA type machine is constituted by a plurality of modules, each module comprising an optimal number of processors and a physical part of the total memory of the machine. A machine of this type has non-uniform memory access because it is generally easier for a module to access a physical part of the memory that it does not share with another module than to access a part that it shares. Although each module has a private system bus linking its processors and its physical memory, an operating system common to all the modules makes it possible to consider all of the private system busses as a single, unique system bus of the machine. A logical addressing assigns a place of residence to a predetermined physical memory location of a module. For a specific processor, accesses to a local memory part physically located in the same module as the processor are distinguished from accesses to a remote memory part, physically located in one or more modules other than that in which the processor is located.

One particular type of NUMA machine is the cache coherency non-uniform memory access (CCNUMA) type, that is, the type of machine having cache coherency. A shared caching mechanism ensures that at a given instant, a valid, that is updated, copy of this block is not necessarily located in its physical memory location of residence. Thus, one or more updated copies of the block can migrate from one module to another in response to application requests and system calls. The physical memory located within a specific module is the one that the module in question accesses the fastest, since it does so directly through its local system bus. The remote physical memory in another module is the one that the module in question accesses the slowest, since it requires one or more transactions between modules. The physical memory local to the module in question comprises a first part specifically assigned to the data blocks resident in this module, and a second part specifically assigned to copies of blocks resident in other modules. The second part of the physical memory constitutes a cache for a remote memory in the other modules.

A block resident in the first physical memory part is not immediately available if its contents do not constitute an updated copy, which is the case, for example, if one or more other modules share this block and if one of these other modules maintains a copy of it that is up-to-date in terms of memory coherency. In order to manage the sharing of blocks resident in the its first physical memory part with other modules, the module in question has a local memory table LMD (Local Memory Directory). The table LMD is constituted by several lines, each of which is intended to reference a block resident in the module that is shared with one or more other modules. The more lines the table LMD contains, the more resident blocks can be shared by the other modules at a given instant. This is advantageous for the other modules, but can be less so for the module in question, since the location of the updated copies of its resident blocks risks being more scattered, and consequently requiring longer access times. On the other hand, it is preferable to locate the table LMD in a fast access memory, since it is involved in access to the first physical memory part. The cost of using fast access memories, for example static memories, makes it prohibitive to reference, in the table LMD, all of the blocks resident in the first physical memory part.

A block that is not resident in the first physical memory part is immediately available if an updated copy of this block is accessible in the second physical memory part. In order to manage the presence of updated copies in the second physical memory part, the module in question has a remote cache table RCT. The table RCT is constituted by a plurality of lines, each of which is intended to correspond to a location in the second physical memory part, each location being intended to contain a copy of a block referenced by this line. The table RCT therefore contains as many lines as there are locations that can be contained in the second physical memory part. It is understood that the greater the size of the second physical memory part, the more copies of blocks resident in other modules the latter can contain. However, a second physical memory part with a size capable of containing copies of all the blocks resident in other modules at one time would be disproportionately large. On the other hand, it is preferable to locate the table RCT in a fast access memory, since it is involved in the access to the second physical memory part. The cost of using fast access memories, for example static memories, makes it prohibitive to reference, in the table RCT, all of the blocks resident in the other modules.

In producing a machine constituted by a plurality of modules, each of which comprises a table LMD and a table RCT, the constraints described above illustrate the necessity for the size of these tables to be compatible with the desired performance of the machine. The problem is that this compatible size is difficult to obtain a priori.

SUMMARY OF THE INVENTION

The subject of the invention is a process for producing a machine constituted by a plurality of modules, a given module comprising a physical memory constituted by at least two parts, a first part for containing data blocks resident in the module in question, and a second part for containing copies of data blocks resident in other modules, characterized in that it is comprised of:

providing the module in question with two tables LMD and RCT, each of which contains a predetermined number of lines, each line of the first table LMD being intended to index a block address resident in the first physical memory part available to be shared with one or more other modules, and to index another block address resident in the first physical memory part for replacement following an access request from another module, each line of the second table RCT being intended to reference a block address resident in another module, a copy of which is accessible at a location in the second physical memory part corresponding to this line, and to reference another block address resident in another module for replacement following an access request from the module in question, having the machine operate in a given operating mode, counting a number of replacements in the first table LMD and/or a number of replacements in the second table RCT, adapting the architecture of the machine so that the number of replacements in the first table or the second table is lower on average than a threshold for this given operating mode.

According to a first variant of the process, the architecture of the machine is adapted by providing the first and/or the second table with a number of lines such that the number of replacements is lower on average than this threshold.

Another subject of the invention is a machine constituted by a plurality of modules, each given module comprising a physical memory constituted by at least two parts, a first part for containing data blocks resident in the module in question, and a second part for containing copies of data blocks resident in other modules, characterized in that the module in question comprises:

two tables LMD and RCT, each of which contains a predetermined number of lines, each line of the first table LMD being intended to index a block address resident in the first physical memory part available to be shared with one or more other modules, and to index another block address resident in the first physical memory part for replacement following an access request from another module, each line of the second table RCT being intended to reference a block address resident in another module, a copy of which is accessible at a location in the second physical memory part corresponding to this line, and to reference another block address resident in another module for replacement following an access request from the module in question, a counter of the number of replacements in the first table LMD and/or a counter of the number of replacements in the second table RCT.

BRIEF DESCRIPTION OF THE DRAWINGS

The invention will be more clearly understood with the aid of the following description of an exemplary embodiment, in reference to the figures.

DESCRIPTION OF THE PREFERRED EMBODIMENT(S)

Figure 1:
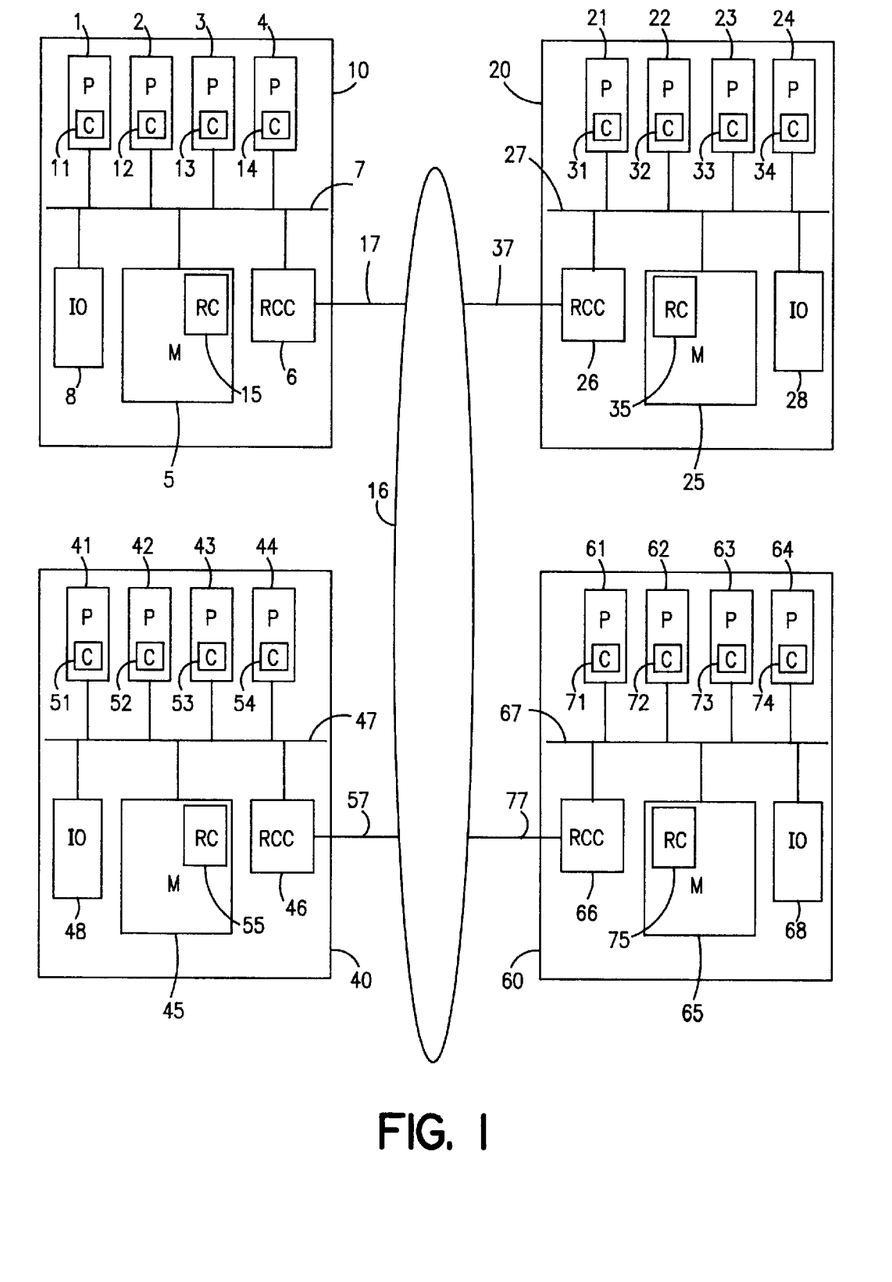
FIG. 1 presents an architecture of a machine with four modules.

FIG. 1 presents an exemplary architecture of a machine with non-uniform memory access constituted by four modules 10, 20, 40, and 60 interconnected by means of a ring 16. The following description in reference to FIG. 1 is valid for any number of modules greater than or equal to two. The connection between the modules can be achieved by means of one or more switched rings or by any other types of connections such as grid or hypercube interconnections or crossbar switches, to cite just a few of the better known types. The interconnection of the modules makes it possible to carry out transactions between modules that use the memory coherency protocol.

The module 10 comprises four processors 1 through 4, a memory 5 and a unit 6 for connecting to the other modules through the ring 16. The various elements 1 through 6 are connected to one another through a system bus 7 in the module 10. The module 20 comprises four processors 21 through 24, a memory 25, and a unit 26 for connecting to the other modules through the ring 16. The various elements 21 through 26 are connected to one another through a system bus 27 in the module 20. The module 40 comprises four processors 41 through 44, a memory 45 and a unit 46 for connecting to the other modules through the ring 16. The various elements 41 through 46 are connected to one another through a system bus 47 in the module 40. The module 60 comprises four processors 61 through 64, a memory 65 and a unit 66 for connecting to the other modules through the ring 16. The various elements 61 through 66 are connected to one another through a system bus 67 in the module 60. The unit 6, respectively 26, 46, 66, is connected to the ring 16 by means of a link 17, respectively 37, 57, 77.

Each processor 1 through 4, 21 through 24, 41 through 44, 61 through 64 respectively has a private, internal and/or external cache memory 11 through 14, 31 through 34, 51 through 54, 71 through 74. Moreover, the module 10 comprises a remote access cache memory 15 labelled RC, the module 20 comprises a remote access cache memory 35 labelled RC, the module 40 comprises a remote access cache memory 55 labelled RC, and the module 60 comprises a remote access cache memory 75, labelled RC. In order to be able to parameterize the size of the cache memory 15, 35, 55, and/or 75, it is advantageous to physically locate the latter in a dedicated area of the memory 5, 25, 45, 65, respectively, as shown in FIG. 1. In this case, the description below will consider the memory 5', respectively 25', 45', 65', to be constituted by data blocks of the memory 5, respectively 25, 45, 65 which do not comprise data blocks of the cache memory 15, respectively 35, 55, 75. In the case where the cache memories 15, 35, 55, 75 are embodied by means of physical components different from those of the memories 5, 25, 45, 65, the references 5', 25', 45', 65', which are identical to the references 5, 25, 45, 65, must be included.

Each processor 1 through 4, 21 through 24, 41 through 44, and 61 through 64 accesses data blocks contained in the memories 5', 25', 45', 65' by means of logical addresses of a single address space, without distinguishing whether the memories 5', 25', 45', 65' are local, belonging to the same module as the processor, or remote, belonging to a different module than the processor. In the module 10, it is the unit 6 that distinguishes whether the logical address corresponds to a local physical address of a block resident in the memory 5', or whether the logical address corresponds to a remote physical address of a block resident in one of the modules 20, 40, 60, for example by means of the high-order bits of the logical address, which indicate the module in which the addressed memory is physically located, the low-order bits in this case indicating the physical address in the module of residence. In the module 20, it is the unit 26 that distinguishes whether the logical address corresponds to a local physical address of a block resident in the memory 25', or whether the logical address corresponds to a remote physical address of a block resident in one of the modules 40, 60, 10, for example by means of the high-order bits of the logical address, which indicate the module in which the addressed memory is physically located, the low order bits in this case indicating the physical address in the module of residence, and so on for the other modules. The aforementioned high-order bits constitute a field A4 of the logical address. The data blocks accessed in this way constitute a memory set SM shared by all the processors.

The following example in reference to the processor 1 is valid for all of the other processors 2 through 4 in reference to the module 10, as well as 21 through 24 in reference to the module 20, 41 through 44 in reference to the module 40 and 61 through 64 in reference to the module 60.

The processor 1 processes a word contained in a data block B1 of the set SM by means of its private cache memory 11 using a known caching mechanism, such as a mechanism with direct correspondence, associative correspondence, or associative correspondence by block set, and it is not necessary to review these various mechanisms here.

It need only be recalled that a cache memory essentially comprises a fast access memory and a correspondence table, not represented in the figures. In the case of a direct correspondence or direct mapping mechanism, there are essentially three fields distinguished in the logical address of a word, in decreasing order of bit significance: a first field A1 called a label, a second field A2 called an index and a third field A3 called an address of the word in the data block containing this word. The first and second fields usually constitute the logical address of the block B1. The index A2 points to a line of a correspondence table which essentially contains two values. The first value is the label A1' of a block B2, a physical image of which is addressed directly in the fast access memory by this same index. The second value is a status code which indicates whether the block B2 is maintained exclusively by the processor or shared by another processor, and in the latter case whether its content is valid or whether it has been modified by this other processor.

If the label A1 of the block B1 is equal to the label A1' of the block B2 and if the status code indicates exclusivity or a valid content, the block B2 is none other than the block B1 physically contained in the fast access memory, and the processor can process the words contained in this block directly by physically addressing them in the fast access memory using the second and third fields of the logical address. If the status code indicates sharing, the caching mechanism sends through the bus 7 a signal S1 to indicate a modification at the address of the block B1, in order to modify the status code of this block in the cache memories that share it.

If the label A1 of the block B1 is different from the label A1' of the block B2 or if the status code indicates sharing and a modified content, the processor can not process the words contained in this block directly by physically addressing them in the fast access memory using the second and third fields of the logical address. If the status code indicates exclusivity, the caching mechanism sends a request Q2 to write the block B2 into the shared memory so as to free up a space in the cache memory at the physical address indicated by the index A2, then sends a request Q1 to read the block B1 in the shared memory in order to load the block B1 into the cache memory at the physical address indicated by the index A2. If not, the caching mechanism sends a request Q1 to read the block B1 in the shared memory in order to load the block B1 into the cache memory at the physical address indicated by the index A2.

Figure 2:
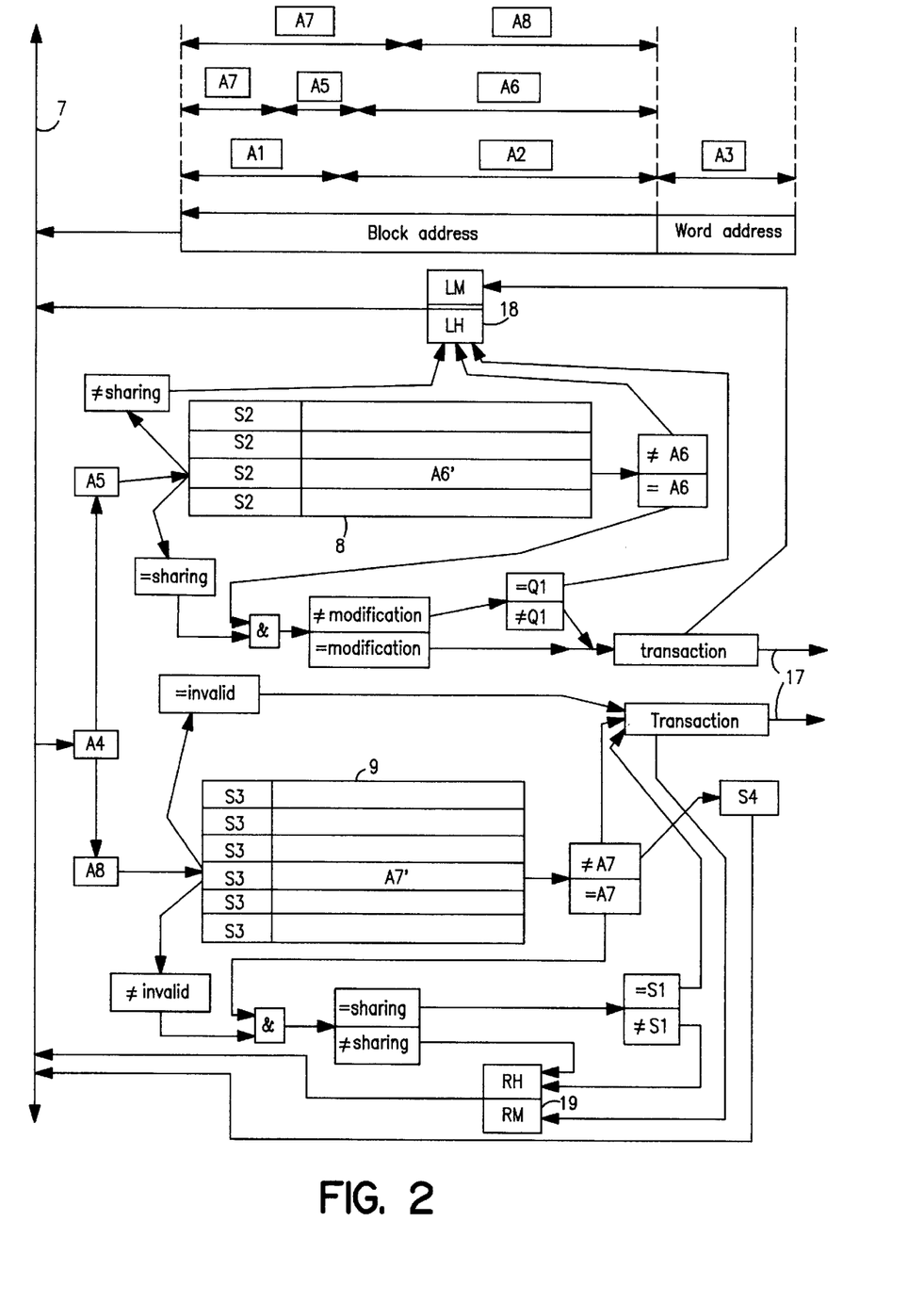
FIG. 2 presents certain details of the aforementioned unit, located in a module considered to be local.

FIG. 2 presents a first level of detail of the unit 6, with the hardware and logical components involved when a block address constituted by the fields A1 and A2 travels through the bus 7 while being linked to a signal S1 or a request Q1 or Q2. The unit 6, labelled RCC, comprises a table 8, labelled LMD, a table 9, labelled RCT, a register 18 and a register 19. The address of the block is also divided into three fields A4 through A6 or into two fields A7 and A8. The field A4 is constituted by bits of a higher order than those of the field A5 and the field A6 is constituted by bits of a lower order than those of the field A5. The field A8 is constituted by low order bits and the field A7 is constituted by high order bits in a quantity greater than that of the bits of the field A4 so as to overlap the field A4. The purpose of the fields A4 through A8 will be revealed later in the description. The logic for writing in the registers 18 and 19 as a function of the values of the fields A4 through A8 is represented by means of cells in which logical functions are indicated. Each pair of cells containing the same word, preceded by the sign = in one and the sign ≠ in the other, represents a comparator whose result activates a logical level downstream. One of two possible states of a signal, symbolically represented by a pair of cells, is written in each of the registers 18 and 19. The logic described can be embodied by means of a microprocessor specifically dedicated to the unit 6. Implementing this logic by means of hardware circuits increases its execution speed. The explanations in reference to FIG. 2 for the unit 6 considered to be local to the module 10 and remote from the modules 20, 40, 60 remain valid for the units 26, 46, 66 by replacing the references by circular permutation, and particularly by replacing, according to the same circular permutation, 8 with 28, 48 or 68, and 9 with 29, 49 or 69 depending on the module in question.

When the unit 6 sees the signal S1, the request Q1 or the request Q2 passing through the bus 7, it processes the block in question through a caching mechanism, using its table 8 if the high order bits contained in the field A4 of the logical address indicate that the block in question physically resides in the memory 5', local to the module 10, and using its table 9 if the high order bits of the label indicate that the block in question physically resides in one of the remote modules 20, 40 or 60.

The table 8 is indexed by m bits constituting a field A5 of the logical address which follows the high order bits of the label. The value of the number m directly determines the size of the table 8, wherein the number of lines is equal to $2^m$. Each line of the table 8 contains the low order bits constituting a field A6 of the logical address of a block shared with one or more remote modules and a status code S2. The status code S2 is, for example, a byte constituted by presence bits and status bits. A presence bit is assigned to each module 20, 40, 60 remote from the module 10 in which the block referenced by the fields A5 and A6 resides, in order to indicate the presence or absence of a sharing of this block with the remote module 20, 40, 60. The status bit or bits indicate(s) whether the block has been modified by a remote module. At a given instant, only one module holds the modified copy that constitutes the most recently updated copy of the block. This means that if the status code S2 indicates a modification, there is no more than one presence bit which indicates the sharing of this block with a remote module, and that is the bit assigned to the module that contains the most recently updated version. The copy of the block in the module 10 is no longer up-to-date and the copies of the block in the other modules are invalidated. If the status code does not indicate any modification, this means that the module 10 is holding an updated copy of the block, and that all the modules in which the presence bit has been raised hold an updated copy of the block, shared with the module 10. If there is no presence bit indicating the presence of a sharing with a remote module, the most recently updated copy of the block is located in the module 10. The corresponding line of the table 8 is then available to reference another block if necessary. In this case, the low order bits of the logical address of a block are the bits that follow the aforementioned m bits, in such a way that the concatenation of the fields A4, A5 and A6 overlaps the fields A1 and A2. The fields A5 and A6 make it possible to physically address the block in the local memory constituted by the memory 5'.

If the line indexed by the m bits of the field A5 contains an address value different from that of the block processed, this means that no module other than the module 10 accesses it. The processing of the block therefore remains local to the module 10 and it is not necessary to index it in the table 8, since its updating in the memory 5' and possibly in the private cache memories 11 through 14 is enough. The unit 6 generates a local hit signal LH to indicate a local hit without any transaction with a remote module. The signal LH is written into the register 18. The same is true if no bit of the status code S2 indicates sharing with a remote module.

If the line in the table 8 indexed by the m bits of the field A5 contains an address value A6 equal to that of the block processed, and at least one bit of the status code indicates sharing, this means that a module other than the module 10, for example the module 20, has accessed it previously. In this case, the processing of the block depends on its previous access by the remote module 20 and on the processing related to this block. If the status code S2 indicates that the block is currently in shared use, the unit 6 determines whether it is necessary to carry out a transaction with the remote module 20.

If the status code S2 indicates that the block has been modified by a remote module, a read request Q1 requires a transaction with the remote module that holds a valid copy of the block in order to retrieve this valid copy into the physical memory resident in the module 10, so the unit 6 generates a local miss signal LM to indicate a local miss, which is accompanied by at least one transaction with a remote module. The signal LM is written into the register 18, then the unit 6 updates the code S2 to the unmodified status at the end of the transaction.

If the status code S2 does not indicate that the block has been modified by a remote module, a read request Q1 does not require a transaction with any remote module, since the module 10 is holding a valid copy of the block, so the unit 6 generates a local hit signal LH. On the other hand, a signal S1 indicating a modification or a request Q2 to write the block requires a transaction with each remote module for which a bit of the code S2 indicates a presence, in order to inform it that the copy of the block it holds is not valid, so the unit 6 generates the local miss signal LM.

The generation of the signals LH and LM has been explained with a write-back caching mechanism. With a write-through caching mechanism, it is understood that the request Q1 does not require a transaction, since the module 10 holds an updated copy of the block, so the unit 6 generates a signal LH, and that the request Q2 or the signal S1 requires a transaction with at least one remote module 20 in order to update the copy of the block in this module, in which case the unit 6 generates a signal LM.

The table 9 is indexed by n low order bits of the logical address, which constitute a field A8. The value of the number n directly determines the size of the table 9, wherein the number of lines is equal to $2^n$. Each line of the table 9 contains a status code S3 and the field A7 of the logical address, which references a copy of a block indexed directly in the cache memory 15 by the field A8. The size of the cache memory 15 is therefore $2^n$ blocks. The status code S3 is constituted, for example, by two bits for coding three states Inv, Sha, Mod, which indicate the state of a block referenced in the table 9 by the field A8. The state Inv indicates that the referenced block is invalid, which means that the referenced block has been modified by a remote module 20, 40 or 60. The state Sha indicates that the referenced block is shared by at least one remote module 20, 40, 60. The state Mod indicates that the referenced block has been modified by the local module 10 and that its copy in the cache memory 15 is up-to-date.

If the line indexed by the n bits of the field A8 contains a value of the field A7' equal to that of the block processed, this means that the block resident in a module other than the module 10, for example in the module 20, has been copied into the cache memory 15 common to the processors 1 through 4. The cache memory is sized to contain $2^n$ blocks referenced in the table 9. Just as the size of the table 9 can be parameterized by choosing the value of n, so can the size of the cache memory 15. One advantageous way to enable it to be parameterized is to obtain a dedicated address storage area from the memory 5 and allocate it to the cache memory 15. This method is then repeated in each remote module 20, 40, 60 in order to allocate a dedicated address storage area in the memory 25, 45, 65 to a cache memory 35, 55, 75. Since the size of the cache memories 15, 35, 55, 75 is small relative to that of the memories 5, 25, 45, 65, this method only slightly reduces the size of the memory common to all the modules.

The unit 6 then considers the status code S3 of the block referenced in the table 9, that is, the block processed by the signal S1 or a request Q1, Q2. If the status code S3 indicates that the block is invalid, the unit 6 generates the same transactions and the same signals as though the line indexed by the n bits of the field A8 contained a value of the field A7' different from that of the block processed, as explained later in the description.

If the status code S3 indicates that the block is not shared by another module, no transaction with a remote module is necessary, and the unit 6 generates a remote hit signal RH to indicate a remote hit achieved without a transaction with a remote module.

If the status code in the table 9 indicates that the block is currently in shared use, the unit 6 determines whether it is necessary to execute a transaction with the remote module 20. For the signal S1, a transaction is necessary to write into the status code S2 of the module 20, in which the block is resident, that the block has been modified, and into the status code S3 of the module 40 or 60, which possesses a copy of the block in its cache memory 55, 75, that the block is invalid; the unit 6 then generates a remote miss signal RM to indicate a remote miss for which at least one transaction with a remote module has been initiated. The unit 6 declares in its status code S3 that the block has been modified. For the request Q2 to write into the memory remote from the module 10, no transaction is necessary, and the unit 6 generates a remote hit signal RH. For the read request Q1, if the status code S3 in the table 9 indicates that the content of the block in the module 10 is valid, no transaction is necessary and the unit 6 generates a remote hit signal RH; if the status code in the table 9 indicates that the content of the block in the module 10 is invalid, a transaction is necessary to update the content of the block in the module 10, so the unit 6 generates a remote miss signal RM and declares in its status code S3 at the end of the transaction that the block is valid. The generation of the signals RH and RM has been explained here with a write-back caching mechanism. With a write-through caching mechanism, it suffices to modify the logic described so that the signal S1 and the request Q2 require a transaction with the remote module 20, 40, 60 in order to update the block in each of them, the unit 6 in this case generating a signal RM in such a way that the request Q1 does not require a transaction, since the content of the block has been updated systematically.

If the line indexed by the n bits contains an address value different from that of the block processed, this means that the block addressed logically in the cache memory 15 by the indexing of the table 9 is different from the processed block. In this case, it is necessary to replace the block referenced in the table 9 with the processed block. Therefore, the unit 6 generates a signal RM. The unit 6 in this case also generates a signal S4 to indicate a replacement, in the cache memory 15, of the indexed block with the processed block. The signal S4 is sent through the bus 7 to invalidate, in the private cache memories 11 through 14, the block indexed in the cache memory 15, since the table 9 can no longer guarantee its coherency. The unit 6 also informs the unit 26, 46 or 66 of the module of residence that it is no longer referencing the block, so that the unit 26, 46, or 66 lowers the presence bit corresponding to the module 10 in the line of the table 28, 48 or 68 in which the block was referenced. The unit 6 then performs an update on the table 9 by means of a transaction with the remote modules 20, 40, 60, in order to retrieve the processed block at a physical location addressed logically in the cache memory 15 by the indexing of the table 9. The transaction essentially consists of sending a read request directed to the remote module 20, 40 or 60 in which the block resides. In order to simplify the description, it will be assumed, for example, that the block's module of residence is the module 20.

Figure 3:
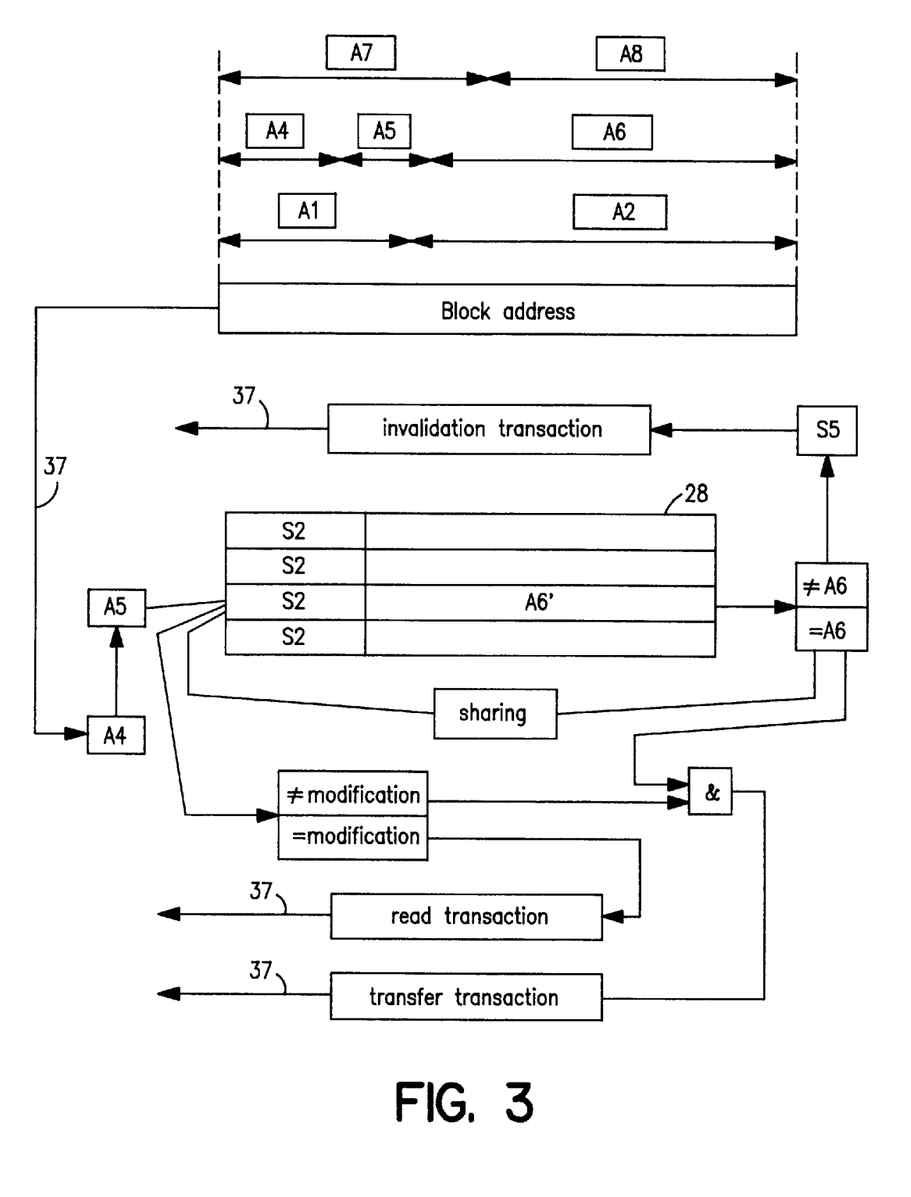
FIG. 3 presents certain details of the aforementioned unit, located in a module considered to be remote.

FIG. 3 presents a second level of detail of the unit 6, 26, 46, 66 with the hardware and logical elements involved when a block address constituted by the fields A1 and A2 arrives in this block's module of residence, having come from other modules through the link 17, 37, 57, 77. The remarks made in the introductory preamble to FIG. 2 remain valid for FIG. 3. In particular, the reference numbers used in FIG. 3 are those of the unit 26 in order to simplify the rest of the description.

If the processed block is indexed in the table 28, its status code S2 is updated in order to indicate that the block is shared by the module 10. If, on the line of the table 28 that indexes the processed block, the status code S2 indicates that the block has not been modified by any other module 40, 60, the unit 26 transmits a copy of the block to the unit 6. This copy is obtained by reading in the memory 25 or in one of the cache memories 31 through 34. If the status code indicates that the block has been modified, the unit 26 sends a read request to the module 40 or 60 that possesses the most recently updated version of the block. The unit 46 or 66 that possesses the most recently updated copy transmits the copy of the block to the unit 6 of the module 10 and to the unit 26 of the module 20. The unit 26 updates its local memory 25', and its code S2 to the shared status. The unit 6 indexes the block in the table 9 with a shared, unmodified status code and writes the block into the cache memory 15. Then, the unit 6 sends an acknowledgement to the unit 26, which adds to its status code S2 the sharing with the module 10.

If the processed block is not indexed in the table 28, the unit 26 generates a signal S5 to indicate that the indexed block will be replaced by the processed block. If the status code S2 of the indexed block indicates that the latter has been modified by a module 10, 40 or 60, the unit 26 sends a read request to the module 10, 40 or 60 that holds the most recently updated version of the block. The unit 6, 46, 66 in which the code S3 of the indexed block indicates that its copy of the block has been modified, transmits a copy of the block to the unit 26 of the module 20 in order to update its local memory 25'. The signal S5 is sent to the unit or units 6, 46, 66 which reference the block in a line of their table 9, 49, 69 so that each of them updates its code S3 to the invalid status. Then, the unit 26 indexes the processed block in its table 28 with a status code S2 indicating that the block is shared with the module 10, unmodified. Finally, the unit 26 transmits the content of the processed block to the unit 6, which indexes the block in the table 9 with a non-invalidated, shared and unmodified status code and writes the block into the cache memory 15. If the status code S2 of the block indexed in the table 28 does not indicate that the latter has been modified, the signal S5 is sent to the unit or units 6, 46, 66, which reference the block on one line of their table 9, 49, 69 so that each of them updates its code S3 to the invalid status. Next, the unit 26 indexes the processed block in its table 28 with a status code S2 indicating that the block is shared with the module 10, unmodified. Finally, the unit 26 transmits the content of the processed block to the unit 6, which indexes the block in the table 9 with a non-invalidated, shared and unmodified status code and writes the block into the cache memory 15.

The preceding explanations are based on a direct correspondence caching mechanism. The implementation of the teaching provided should not pose any insurmountable problem for one skilled in the art when using other known caching mechanisms such as those with associative correspondence or associative correspondence by block set, in all or some of the private cache memories 11 through 14, 31 through 34, 41 through 44, 61 through 64 and the tables 8, 9, 28, 29, 48, 49, 68, 69.

In particular, it is advantageous to use an associative correspondence by block set in the tables 8, 28, 48, 68. For the same number of bits constituting the field A5, an associative correspondence in sets of, for example, four blocks, requires four times as much memory for the table 8 as a direct correspondence, since each line can reference four blocks, each with its own status code S2. However, in direct correspondence, when a block needs to be referenced in a line indexed by its field A5, there is no problem if the line is available, but it is necessary to make a replacement if the line is already referencing another block wherein the field A6' is different from the field A6 of the block to be referenced. A line is available if no block is referenced in it or if the status code S2 of the block already referenced indicates any presence of sharing with a remote module, in which case the reference of such a block is said to be invalid. Advantageously, in associative correspondence in sets of, for example, four blocks, a line is available if less than four blocks are referenced in it or if the reference of at least one already referenced block is invalid. The chances that the reference of an already referenced block will be invalid before a new block is to be referenced are thus increased in comparison with a direct correspondence mechanism. If a replacement is necessary due to the unavailability of a line, it can be performed in the oldest block or in the block with the smallest number of raised presence bits in its status code S2. This reduces the possibility that another module will immediately re-request to reference a block that has just been replaced.

Figure 4:
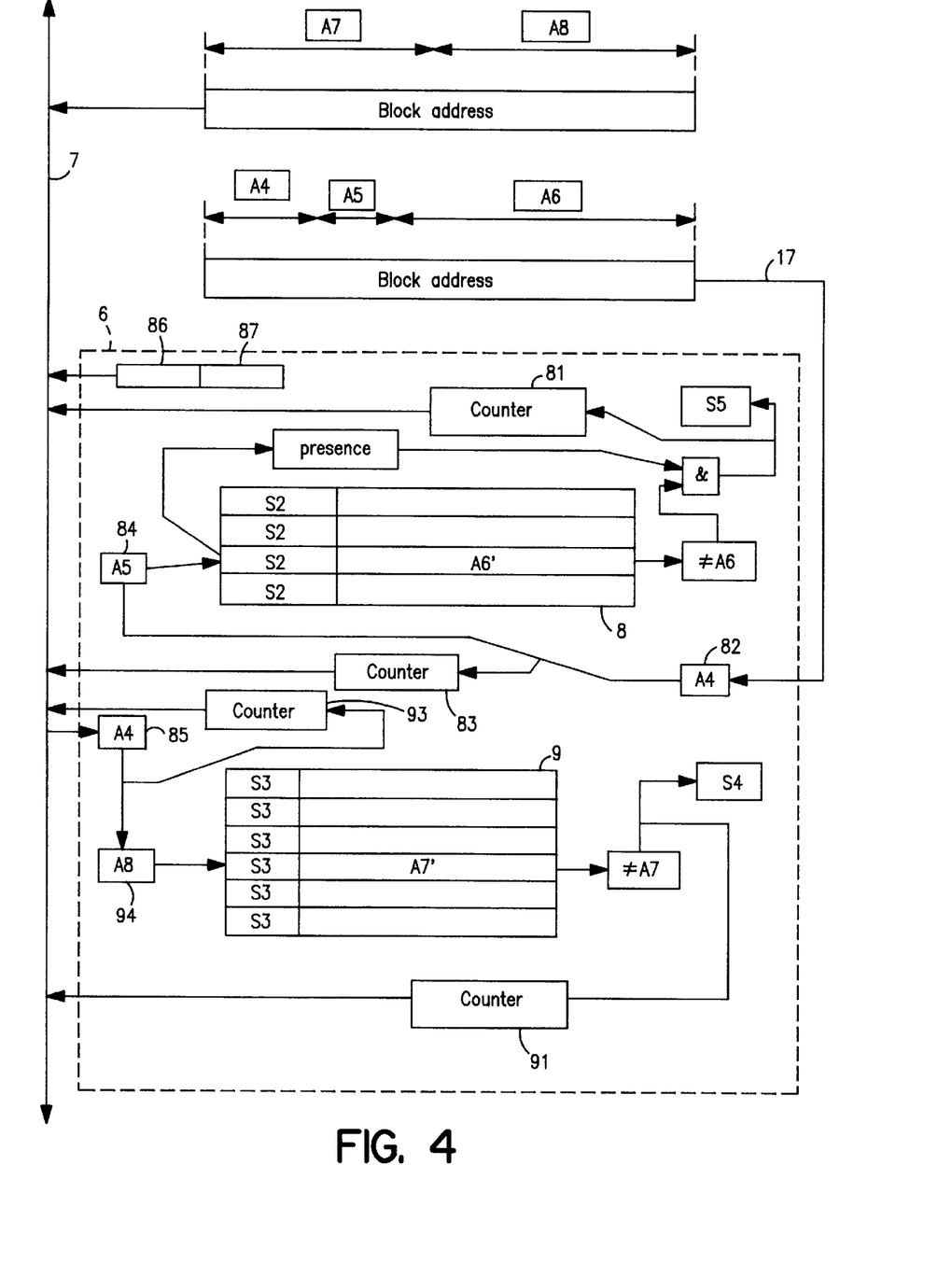
FIG. 4 presents other details of this unit for implementing the invention.

FIG. 4 presents additional details of the unit 6. The units 26, 46, 66 are identical. What is of interest here are the block addresses passing through the bus 7 which relate to the blocks residing in modules other than the module 10, and the block addresses coming from the link 17 which relate to the blocks residing in the module 10. The structure of a block address passing through the bus 7 is only represented here by the fields A7 and A8, the high order bits of the field A7 comprising the field A4, and the structure of a block address coming from the link 17 is only represented by the fields A4 through A6 since, as seen above, the fields A1 and A2 are more particularly useful for the level of the private cache memories 11 through 14. A filter 85 routes a block address passing through the bus 7 to the table 9 if the field A4 relates to a block address residing in a module 20, 40, 60 remote from the module 10. An index register 94 points to an entry in the table 9 addressed by the field A8 of the block address. A filter 82 routes a block address coming from the link 17 to the table 8 if the field A4 relates to a block address residing in the module 10. An index register 84 points to an entry in the table 8 addressed by the field A5 of the block address. The filters 82 and 85 can be distinct or can have all or some of their elements in common.

Each time the filter 82 routes a block address coming from the link 17 to the table 8, a counter 83 is incremented. The counter 83 counts the number of accesses to the table 8 by a remote module. The counter 83 is read-accessible through the bus 7.

With the filter 82 routing the block address to the table 8, it has been seen in the description of FIG. 3 that the unit 6 determines whether the block has already been indexed in the table 8 by comparing the field A6 of the incoming block with the field A6' of a block already indexed in a line of the table 8. If no line of the table 8 indicated by the register 84 is available to contain a value A6' equal to the value of the field A6 of the address of the block presented, a signal S5 is generated in the unit 6 to indicate the necessity for a replacement, in order to index the block requested from the link 17 in place of a previously indexed block. This replacement also generates one or more transactions with the other modules 20, 40, 60 in order to transmit to the module 20, 40, 60 which originated the presentation of the address presented through the link 17, an updated copy of the newly indexed block. With each generation of a signal S5, a replacement counter 81 is incremented. The content of the counter 81 is accessible through the bus 7, for example by means of a read operation of the input-output type.

Each time the filter 85 routes a block address coming from the bus 7 to the table 9, a counter 93 is incremented. The counter 93 counts the number of accesses to the table 9 by the local module 10. The counter 93 is read-accessible through the bus 7. It has been seen in reference to FIG. 2 that each access to the table 9 by the module 10 generates a signal RH or a signal RM. If the number of signals RH and the number of signals RM are also counted, the number of accesses to the table 9 can be calculated as being equal to the sum of the number of signals RH and the number of signals RM.

While the filter 85 routes the address of the block to the table 9, it has been seen in the description of FIG. 2 that if the value A7' contained in the line of the table 8 indicated by the register 84 is different from the value of the field A7 of the address of the block presented, a signal S4 is generated in the unit 6 to indicate the necessity for a replacement, in order to index the block passing through the bus 7 in place of the previously indexed block. With each generation of the signal S4, a replacement counter 91 is incremented. The content of the counter 91 is accessible through the bus 7, for example by means of a read operation of the input-output type.

It is important to understand that the content of the counter 91 is correlated with the number of transactions required to make replacements in the table 9, and only to the number of these transactions. The content of the counter 91 is independent from the transactions that do not require replacement. For example, in FIG. 2, if the status code S3 of the block contained in the line indicated by the field A8 indicates an invalid state, at least one transaction with a remote module is necessary. However, if the value A7' contained in this line is equal to the value of the field A7, the block addressed is already indexed and thus does not require any replacement of this line. Although this generates a remote miss signal RM, it does not affect the content of the counter 91.

Each of the counters 81, 83, 91, 93 is designed to send an interrupt through the bus 7 in case of an overflow. FIG. 4 also distinguishes a control register 86 and a status register 87. The register 86 is read- and write-accessible through the bus 7. The register 87 is read-accessible through the bus 7 and systematically reset to zero by a reading of its contents.

The register 87 contains, for each counter 81, 83, 91, 93, a bit whereof a predetermined logical state indicates an overflow of the counter to which this bit is assigned.

The register 86 contains bits for controlling the counters 81, 83, 91, 93 by means of a combinational logic element, which is not represented so as not to complicate the figure unnecessarily. A first bit is provided for deactivating the counters 81 and 83 unconditionally, so that one logical state of the bit makes it impossible to modify the contents of the counters following any new access to the table 8 and so that the complementary logical state of the bit makes it possible to modify the contents of the counters following any new access to the table 8. A second bit is provided for deactivating the counters 81 and 83 conditionally, so that one logical state of the bit makes the contents of the counters incapable of being modified by a new access to the table 8 following an overflow indicated by a bit of the register 87 and so that the complementary logical state of the bit makes the contents of the counters 81 and 83 capable of being modified by a new access to the table 8, independently from the contents of the register 87. A third bit is provided for deactivating the interrupt in case of an overflow as mentioned above, so that one logical state of the bit makes the interrupt active and so that the complementary logical state of the bit makes the interrupt inactive. A fourth bit is provided for resetting the contents of the counters 81, 83 to zero. In identical fashion, for accesses to the table 9, a first, second, third and fourth bit manage the activation of the counters 91 and 93. These bits can be the same as those that manage the counters 81 and 83 or bits specific to the counters 91 and 93. It is possible to provide a fourth bit common to all the counters or as many fourth bits as there are counters, in which case each fourth bit acts on the counter to which it is assigned.

It is important to understand that the management of the counters, physically located in the unit 6, takes place without disturbing the memory accesses through the bus 7 and the link 17 carried out by the processes executed by the processors 1 through 4, 21 through 24, 41 through 44, and 61 through 64. Thus, the counting of the replacements does not of itself generate cache memory hits or misses. Moreover, obtaining access via the bus 7 to the counters 81, 83, 91, 93 by means of read or write operations of the input-output type does not involve the caching mechanisms linked to the tables 8 and 9. The only processes capable of disturbing the caching mechanisms are the processes that use the contents of the counters 81, 83, 91, 93, which can be used to generate reports on the performance of the operating system or of the applications run by the machine. However, these processes can be so insignificant relative to the other processes executed by the machine that the measurements they make it possible to obtain are practically identical to those obtained in the complete absence of any effect of these measuring processes on the caching mechanisms.

The architecture of the registers 86 and 87 makes it possible to create various types of measuring processes implemented by programs executed in the processors 1 through 4. Among these are those activated by an interrupt generated in the register 87, or those activated periodically through interaction with the register 86. A measuring process simultaneously reads the contents of the two counters 81, 83 or the two counters 91, 93 and processes the values obtained.

By dividing the content of the counter 81 by the content of the counter 83, the measuring process determines a replacement rate per access by the remote modules 20, 40, 60 to the table 8. By dividing the content of the counter 91 by the content of the counter 93, the measuring process determines a replacement rate per access by the local module 10 to the table 9.

It has been seen above that each replacement in the table 8 or in the table 9 is accompanied by one or more transactions between modules for updating or invalidating the copies of blocks held by modules other than the module of residence. These transactions have latencies, an excessive accumulation of which runs the risk of slowing down the machine considerably. It is preferable to set a threshold for the number of replacements per access such that exceeding it is deemed harmful to the performance of the machine.

The greater the quantity of blocks that can be referenced per line of a table, the greater the risk of having replacements, since only block per line can be referenced at one time. In order for the number of replacements not to exceed the set threshold, the tables are sized so that each line references a quantity of blocks that does not result in a number of replacements that is higher than the set threshold. In operating the machine, the replacement counters make it possible to verify whether the tables have been sized correctly, and if this is not the case, to consequently increase the size of the tables. While this invention has been described in conjunction with specific embodiments thereof, it is evident that many alternatives, modifications and variations will be apparent to those skilled in the art. Accordingly, the preferred embodiments of the invention as set forth herein, are intended to be illustrative, not limiting. Various changes may be made without departing from the true spirit and full scope of the invention as set forth herein and defined in the appended claims.

What is claimed is:

1. A process for operating a machine constituted by a plurality of modules (10, 20, 40, 60), a given module (10) comprising a physical memory (5) constituted by at least two parts, a first part (5') for containing data blocks resident in the given module (10), a second part (15) for containing copies of data blocks resident in other modules (20, 40, 60), characterized in that the process comprises:

providing the given module (10) with a first table Local Memory Directory (LMD) and a second table Remote Cache Table (RCT), each of which contains a predetermined number of lines, each line of the first table LMD (8) being intended to index a first block address resident in the first physical memory part (5') available to be shared with one or more of the other modules (20, 40, 60) and to index a second block address resident in the first physical memory part (5') for replacement following an access request from one of the other modules (20, 40, 60), each line of the second table RCT (9) being intended to reference a block address resident in one of the other modules (20, 40, 60), a copy of which is accessible at a location in the second physical memory part (15) corresponding to this line, and to reference another block address resident in one of the other modules (20, 40, 60) for replacement following an access request from the given module (10), operating the machine in a given operating mode, establishing a threshold value for said given operating mode, counting a number of replacements in the first table LMD (8) and/or a number of replacements in the second table RCT (9), and adapting the architecture of the machine so that the number of replacements in the first table or the second table is lower on average than a threshold for said given operating mode.

2. The process according to claim 1, characterized in that the architecture of the machine is adapted by providing the first table (8) or the second table (9) with a number of lines such that the number of replacements is lower on average that said threshold.

3. The process according to claim 1, characterized in that the average of the number of replacements in the first table LMD (8) or in the second table RCT (9), respectively, is calculated by dividing the number of replacements by a total number of accesses to the first table LMD (8), or the second table (9), respectively.

4. A machine constituted by a plurality of modules (10, 20, 40, 60), a given module (10) comprising a physical memory (5) constituted by at least two parts, a first part (5') for containing data blocks resident in the given module, a second part (15) for containing copies of data blocks resident in other modules, characterized in that it comprises:

a first table Local Memory Director (LMD) and a second table Remote Cache Table (RCT), each of which contains a predetermined number of lines, each line of the first table LMD (8) being intended to index a block address resident in the first physical memory part (5') available to be shared with one or more other modules (20, 40, 60), and to index another block address resident in the first physical memory part for replacement following an access request from another module, each line of the second table RCT (9) being intended to reference a block address resident in one of the other modules (20, 40, 60), a copy of which is accessible at a location in the second physical memory part (15) corresponding to this line, and to reference another block address resident in another module for replacement following an access request from the given module, a first counter (81) for counting the number of replacements in the first table LMD and a second counter (91) for counting the number of replacements in the second table RCT.

5. The machine constituted by a plurality of modules (10, 20, 40, 60) according to claim 4, characterized in that each module comprises, respectively, a unit (6, 26, 46, 66) for communicating with the other modules, and in that each said unit comprises two tables of the same type as said first and second tables (8, 9) and two counters of the same type as said first and second counters (81, 91).

6. The machine constituted by a plurality of modules (10, 20, 40, 60) according to claim 5, characterized in that said unit comprises a means (83) for counting the total number of accesses to the first table LMD (8) and/or a means (93) for counting the number of accesses to the second table RCT (9).

* * * * *

UNITED STATES PATENT AND TRADEMARK OFFICE
CERTIFICATE OF CORRECTION

PATENT NO.   : 6,148,378
DATED        : November 14, 2000
INVENTOR(S)  : Thierry Bordaz & Jean-Dominique Sorace It is certified that error appears in the above-identified patent and that said Letters Patent is hereby corrected as shown below:

Claim 2, column 15,
Line 5, "that" should be -- than --

Signed and Sealed this

Twenty-third Day of October, 2001

Attest:

NICHOLAS P. GODICI
Attesting Officer    Acting Director of the United States Patent and Trademark Office